United States Patent
Neitzel et al.

(10) Patent No.: US 11,275,861 B2
(45) Date of Patent: Mar. 15, 2022

(54) PROCESS CONTROL SOFTWARE SECURITY ARCHITECTURE BASED ON LEAST PRIVILEGES

(71) Applicant: FISHER-ROSEMOUNT SYSTEMS, INC., Round Rock, TX (US)

(72) Inventors: Lee Allen Neitzel, Austin, TX (US); Dan Halver Ussing, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 14/340,838

(22) Filed: Jul. 25, 2014

(65) Prior Publication Data
US 2016/0026813 A1    Jan. 28, 2016

(51) Int. Cl.
*G06F 21/62*    (2013.01)
*G06F 21/60*    (2013.01)

(52) U.S. Cl.
CPC ........ *G06F 21/6218* (2013.01); *G06F 21/604* (2013.01)

(58) Field of Classification Search
CPC . G06F 9/46; G06F 9/465; G06F 9/468; G06F 9/485; G06F 9/5061; G06F 9/547;
(Continued)

(56) References Cited

U.S. PATENT DOCUMENTS

| 6,389,542 B1 * | 5/2002 | Flyntz | G06F 21/34 380/202 |
| 6,629,123 B1 * | 9/2003 | Hunt | G06F 9/5066 714/E11.209 |

(Continued)

FOREIGN PATENT DOCUMENTS

| CN | 1949179 A | 4/2007 |
| CN | 101071388 A | 11/2007 |

(Continued)

OTHER PUBLICATIONS

Notification of First Office Action for Chinese Application No. 201510441630.7, dated Nov. 28, 2018.
(Continued)

*Primary Examiner* — Richard A McCoy
(74) *Attorney, Agent, or Firm* — Marshall, Gerstein & Borun LLP

(57) ABSTRACT

A process control system software security architecture, that is more effective at preventing zero-day or other types of malware attacks, implements the use of "least privileges" when executing the applications and services run within a computer device. The least privileges based architecture separates "service" processes from desktop applications that run on behalf of a logged-on user by partitioning the global namespace of the software system into service namespaces and logged-on user namespaces, and by strictly controlling communications between the applications and services in these different namespaces using interprocess communications. Moreover, the security architecture uses custom accounts to assure that each service process has the least set of privileges that are needed for implementing its function regardless of the privileges associated with the calling application or user.

67 Claims, 4 Drawing Sheets

(58) Field of Classification Search
CPC . G06F 9/548; G06F 9/54; G06F 9/541; G06F 9/545; G06F 21/6218; G06F 21/604
See application file for complete search history.

(56) References Cited

U.S. PATENT DOCUMENTS

| | | | |
|---|---|---|---|
| 6,826,760 B1* | 11/2004 | Hunt | G06F 9/4425 712/E9.082 |
| 7,308,702 B1 | 12/2007 | Thomsen et al. | |
| 7,606,890 B1 | 10/2009 | Baier et al. | |
| 7,849,469 B1* | 12/2010 | Michel | G06F 8/316 717/100 |
| 8,402,525 B1* | 3/2013 | Shah | H04L 41/0273 726/28 |
| 8,584,211 B1 | 11/2013 | Vetter et al. | |
| 2002/0147924 A1* | 10/2002 | Flyntz | G06F 21/32 726/4 |
| 2003/0208640 A1* | 11/2003 | Just | G06F 8/30 719/330 |
| 2005/0017877 A1* | 1/2005 | Sabatino | F41G 3/04 340/945 |
| 2005/0091214 A1 | 4/2005 | Probert et al. | |
| 2005/0138179 A1* | 6/2005 | Encarnacion | H04L 63/10 709/227 |
| 2006/0015740 A1 | 1/2006 | Kramer | |
| 2006/0075381 A1* | 4/2006 | Laborczfalvi | G06F 9/468 717/100 |
| 2006/0090192 A1 | 4/2006 | Corby et al. | |
| 2006/0150238 A1* | 7/2006 | D'Agostino | H04L 63/102 726/1 |
| 2006/0265761 A1 | 11/2006 | Rochette et al. | |
| 2007/0136723 A1 | 6/2007 | Smith et al. | |
| 2007/0156693 A1 | 7/2007 | Soin et al. | |
| 2007/0192344 A1* | 8/2007 | Meier | G06F 8/10 |
| 2007/0204346 A1* | 8/2007 | Meier | H04L 63/1433 726/25 |
| 2009/0217371 A1* | 8/2009 | Desai | G06F 9/468 726/17 |
| 2010/0332699 A1 | 12/2010 | Genda | |
| 2011/0161988 A1 | 6/2011 | Kashyap | |
| 2011/0296486 A1* | 12/2011 | Burch | H04L 63/0807 726/1 |
| 2012/0023324 A1* | 1/2012 | Sorensen | H04L 63/1416 713/151 |
| 2012/0066512 A1* | 3/2012 | Kass | G06F 8/65 713/189 |
| 2012/0136903 A1* | 5/2012 | Williamson | G06Q 10/10 707/803 |
| 2012/0173698 A1* | 7/2012 | Tsao | G06F 9/526 709/223 |
| 2012/0209946 A1* | 8/2012 | McClure | H04N 21/233 709/217 |
| 2012/0254946 A1* | 10/2012 | Fleischman | H04L 63/0823 726/4 |
| 2013/0086696 A1* | 4/2013 | Austin | G06F 21/335 726/28 |
| 2013/0332941 A1* | 12/2013 | Ramesh | G06F 9/4843 719/314 |
| 2014/0173074 A1 | 6/2014 | Dilmaghani et al. | |
| 2014/0201418 A1* | 7/2014 | Turner | H04L 67/42 710/313 |
| 2014/0208419 A1 | 7/2014 | Chang et al. | |
| 2014/0250521 A1* | 9/2014 | Gallardo | G06F 21/70 726/16 |

FOREIGN PATENT DOCUMENTS

| | | |
|---|---|---|
| CN | 101551756 A | 10/2009 |
| CN | 102214127 A | 10/2011 |
| CN | 102495769 A | 6/2012 |
| CN | 103188237 A | 7/2013 |
| CN | 103593246 A | 2/2014 |
| CN | 103606081 A | 2/2014 |
| CN | 103778368 A | 5/2014 |
| JP | 2000-330802 A | 11/2000 |
| JP | 2005-129066 A | 5/2005 |
| JP | 2005-531831 A | 10/2005 |
| JP | 2006-155416 A | 6/2006 |
| JP | 2011-008530 A | 1/2011 |
| JP | 2013-257873 A | 12/2013 |

OTHER PUBLICATIONS

Notice of Reasons of Rejection for Japanese Application No. 2015-144615, dated May 7, 2019.
Notification of Second Office Action for Chinese Application No. 201510441630.7, dated Aug. 14, 2019.
Notice of Reasons for Rejection for Japanese Application No. 2019-145218, dated Oct. 23, 2020.
Examination Report for Application No. GB1512424.1, dated Dec. 17, 2020.
Search Report for Application No. GB1512424.1, dated Jan. 20, 2016.
Kawakita et al., InfoCase—Information Leakage Protection Software,: NEC Journal of Advanced Technology, 2(1):40-46 (2005).
Notice of Reasons for Rejection for Japanese Application No. 2019-145218, dated Sep. 7, 2021.
Notification of First Office Action for Chinese Application No. 201910292675.0, dated Aug. 3, 2021.
Combined Search and Examination Report for Application No. GB2105489.5, dated Oct. 18, 2021.
Combined Search and Examination Report for Application No. GB2105490.3, dated Oct. 18, 2021.
Combined Search and Examination Report for Application No. GB2105491.1, dated Oct. 18, 2021.
Combined Search and Examination Report for Application No. GB2105492.9, dated Oct. 18, 2021.
Combined Search and Examination Report for Application No. GB2105493.7, dated Oct. 18, 2021.

* cited by examiner

PROCESS CONTROL SOFTWARE SECURITY ARCHITECTURE BASED ON LEAST PRIVILEGES

FIELD OF TECHNOLOGY

This application relates generally to process plant computer systems and, more particularly, to a method and apparatus for securing the operation of software processes within devices, such as computer devices, in a process or plant environment.

DESCRIPTION OF THE RELATED ART

Process control systems, such as distributed or scalable process control systems like those used in power generation, chemical, petroleum, or other processes, typically include one or more controllers communicatively coupled to each other, to at least one host or operator workstation via a process control network and to one or more field devices via analog, digital or combined analog/digital buses. The field devices, which may be, for example valves, valve positioners, switches and transmitters (e.g., temperature, pressure and flow rate sensors), perform functions within the process or plant such as opening or closing valves, switching devices on and off and measuring process parameters. The controller receives signals indicative of process or plant measurements made by the field devices and/or other information pertaining to the field devices, uses this information to implement a control routine and then generates control signals which are sent over the buses to the field devices to control the operation of the process or plant. Information from the field devices and the controller is typically made available to one or more applications executed by the operator workstation to enable an operator to perform any desired function with respect to the process or plant, such as viewing the current state of the plant, modifying the operation of the plant, etc.

The process controllers, which are typically located within the process plant environment, receive signals indicative of process measurements or process variables made by or associated with the field devices and/or other information pertaining to the field devices, and execute controller applications using this information. The controller applications implement, for example, different control modules that make process control decisions, generate control signals based on the received information, and coordinate with the control modules or blocks in the field devices such as HART® and FOUNDATION® Fieldbus field devices. The control modules in the process controllers send the control signals over the communication lines or other signal paths to the field devices, to thereby control the operation of the process.

Information from the field devices and the process controllers is typically also made available to one or more other hardware devices such as, for example, operator workstations, maintenance workstations, servers, personal computers, handheld devices, data historians, report generators, centralized databases, etc., via the process control network. The information communicated over the network enables an operator or a maintenance person to perform desired functions with respect to the process and/or to view the operation of the plant. For example, the information allows an operator to change settings of the process control routine, modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc.

The field devices usually communicate with the other hardware devices over the process control network which may be, for example, an Ethernet-configured LAN. The network relays the process parameters, network information, and other process control data through various network devices and to various entities in the process control system. Typical network devices include network interface cards, network switches, routers, servers, firewalls, controllers, and operator workstations. The network devices typically facilitate the flow of data through the network by controlling its routing, frame rate, timeout, and other network parameters, but do not change the process data itself. As the process control network grows in size and complexity, the number and type of network devices correspondingly increases. As a result of system and network growth, security and management in these complex systems may become increasingly difficult. For example, each network device may include one or more communication ports that provide an access point or port for physically inter-connecting the process control system components and other network devices to each other across the network. Some of these ports or connections, however, can be used to connect the control devices to publicly accessible networks, such as the internet, and to connect portable memory devices to the control system devices. An open port on the device may, therefore, become an access point for network expansion by adding other devices or may allow an entity, malicious or not, to access the network and initiate unwanted and potentially harmful network traffic or to introduce malware (including, for example, malicious programs, spying or data collection programs, adware, or other unwanted and potentially dangerous software) that can cause serious problems within the plant control system. Effectively monitoring or controlling access to all ports on devices within a network that controls communications across a complex process control system rapidly becomes impractical as the number of network devices and associated access points increases.

Likewise, in a typical industrial control system, the workstations/servers are strategically placed between the plant network and the embedded devices that perform control and data acquisition functions (e.g. controllers, PLCs, RTUs), and so a major security objective for these workstations/servers is to prevent malware from entering the control system and adversely affecting the embedded devices, as well to prevent malware from changing the configuration and historical data stored in the plant databases. While a number of security features, such as "anti-virus" software and "white listing" can be used to address this objective, these security features are typically not sufficient. For example, anti-virus software cannot protect against "zero-day" viruses, and white listing only prevents unauthorized applications from running. In addition, some of these features are too intrusive to be operationally practical in a process control system because these security features have the potential to impede activities of plant operators.

In a general sense, malware, such as that at the heart of a zero-day attack, is typically introduced into the control system at a particular device via an external memory device (such as a removable flash drive) or via a communications connection by operation of an application or a service that has the privilege or authorization to access these memory devices, network ports or direct data links. (For the purposes of this patent, communications connections include connections made via a communications network connection or via a direct data link such as a modem connection.) Thereafter, the malware is able to be propagated to other devices (e.g., via communications or portable memory devices) and/or to be executed within a device using the security privileges of the applications or services that become infected with the malware. In addition, the malware may locally persist itself to allow it to be executed again after a reboot. In some cases, the malware may escalate the privileges of a host, e.g., an infected application or a service, using the privileges of the account under which the application or service is being executed and, in doing so, the malware may be able to perform actions or operations within the process control device or system that require a higher privilege, and are thus typically more detrimental to the control system operation. In any event, zero-day attacks that infect an already running application present a major problem in process control systems, as there is no good technique for preventing these types of attacks. However, these attacks can have serious and potentially destructive or even deadly effects within a process plant when these attacks disrupt the on-going operation of the plant control system.

SUMMARY OF THE DISCLOSURE

A process control system uses a new set of security features or a software security architecture that is more effective at preventing zero-day or other types of malware attacks. Generally speaking, the new security features or architecture implements the use of what is referred to herein as "least privileges" when executing the applications and services run within any particular control system device, such as within workstations, servers, databases, controllers, field devices, etc., in order to reduce the impact of malware that may infect a workstation, a server or other device. The term "privilege" here includes both operating system privileges/rights and access control permissions. For example, a user may be granted the right to logon remotely or impersonate another user (privilege) and also be granted access to read/write/execute specific files (permissions).

In a general sense, the least privileges based security features or architecture separate "service" processes from desktop applications that run on behalf of a logged-on user (local or remote) by, for example, partitioning the global namespace of the device (e.g., controller, workstation, server, etc.) into a service namespace and into logged-on user namespaces, if present (e.g., such as in desktop applications). The architecture then strictly controls communications between the processes (e.g., the applications and the services) in these different namespaces using interprocess communications (and not shared memory), so as to prevent an infected service or application from being able to directly infect or corrupt other services or applications. In particular, the new security architecture uses this namespace partitioning to prevent desktop applications from directly accessing objects in the service namespace and vice-versa.

Still further, the new security architecture restricts the privileges granted to services and to desktop applications in a manner that limits or reduces the ability of an infected service or application from being able to detrimentally affect or infect other services or applications. In a general sense, the security architecture limits the operating system privileges of a service or an application or other process to a specified subset of the privileges given to the account under which the service or applications or other process runs or is spawned, restricts privileges for applications started by logged-on users to a sub-set of the privileges associated with that user, and prevents performing privilege elevation via a desktop application (running under the logged on user). In one case, the software security system enforces a restriction that all access to a communications port or to an external media port (e.g., to a removable storage device connected via an external media port such as a USB port) must be performed through a service with restricted privileges (and never by a desktop application), wherein the restricted privileges of the service prevents the service from writing to local data storage (e.g., disk), from communicating via the other of the communications network port or the removable media port, or from acting with administrative privileges. In this manner, if the service becomes infected, the infection becomes benign, as the infection cannot store itself on a local disk or other memory, cannot perform administrative functions, cannot access the desktop, cannot be propagated via a communications network if it came from a removable storage device via an external media port, and cannot be stored on a removable storage device via an external media port or be propagated to another communications connection if it came from a communications connection via a communications port.

Thus, the new security architecture uses access controls that enforce which user accounts and which processes (service or desktop) are authorized to access securable objects through calls to the operating system and its subsystems, and includes mechanisms that prevent lower privileged processes from injecting code into higher privileged processes. To do so, the security architecture includes or uses accounts, commonly called "groups," that allow user accounts and service accounts to belong to an inherit from other group accounts.

The combination of one or more of these security features leads to a more secure software environment within a process control system or process plant that is less susceptible to virus attacks, such as zero-day virus attacks, and other malware, as these security features, alone or in combination, make it difficult, if not impossible, for malware to be imported into the system through the operation of a desktop application accessing a network connection or a removable/portable storage medium connection (such as a USB port). These security features also limit the ability of malware to be imported to an internal data storage device via a network or an external device, for malware to escalate the privileges of services to enable services to access devices, storage medium or processes not needed for the application requesting the service, etc.

Thus, using these features, the new software architecture design partitions (isolates) the services and desktop applications that run in the process control automation system workstations and in the servers for the purpose of reducing their malware attack profile or surface. Moreover, if a service or another process spawned by a service becomes infected, it will not have the privileges necessary to do anything that it is not already doing, and it will not have permissions to access resources that it does not directly need. Additionally, if a desktop application becomes infected, the desktop application will not be able to directly access privileged functions of the operating system, nor will it be able to write directly to the network or to a removable storage device connected via an external media port. Instead, the desktop application will have to request actions to be performed on its behalf by services and their spawned processes that are designed to validate and provide an additional level of access control to privileged functions and resources.

DESCRIPTION

Figure 1:
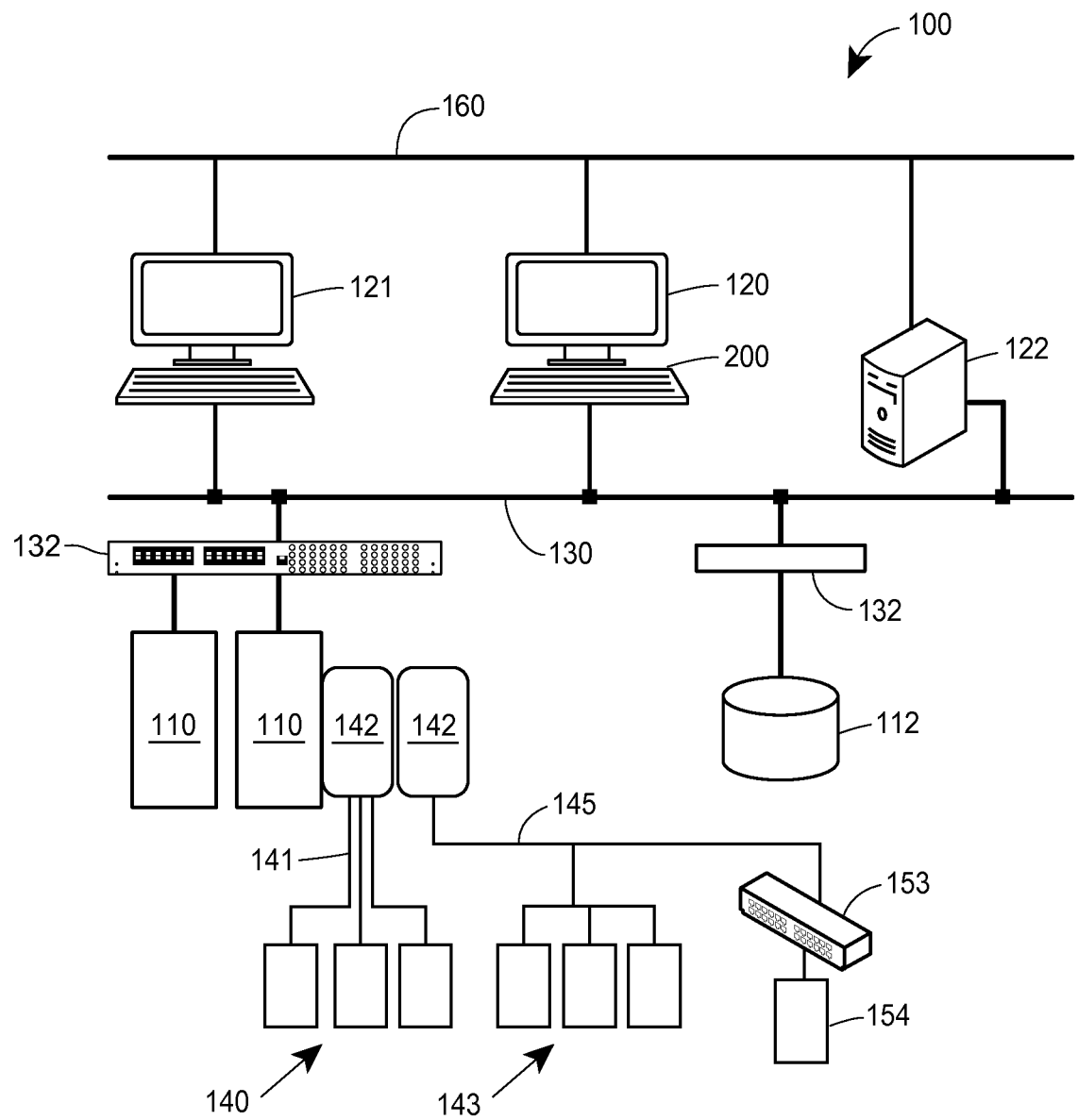
FIG. 1 is an exemplary block diagram of a process plant having a distributed process control system and process automation network including one or more operator and maintenance workstations, servers, controllers, field devices, and other network devices configured to implement the least privileged based software security architecture and functions described herein.

FIG. 1 is a schematic representation of a process control system or process automation system 100 disposed within, for example, a process plant, in which various computer devices may be subjected to various software security features to enhance software security and to facilitate computer/network management and maintenance. More specifically, the process control system 100 includes one or more process controllers 110 and one or more process plant databases 112 (such as data historians), communicatively connected to one or more host workstations or computers 120-122 (which may be any type of personal computers, workstations, servers, etc.) over a process control communications network 130. The controllers 110 and the databases 112 may be connected to the communications network or bus 130 (which may be, for example, an Ethernet communications network) via one or more network interface cards 132. Still further, the controllers 110 may be connected to field devices 140, 143 and 154 within the process plant or control system via input/output (I/O) cards 142. The databases 112 may include one or more data historians which may be any desired types of data collection units or memory devices having any desired type of memory and any desired or known software, hardware or firmware for storing data. Additionally, the databases 112 may be separate from or a part of one or more of the workstations or servers 120-122. The controllers 110, which may be, by way of example, the DeltaV™ controllers sold by Fisher Rosemount Systems, Inc., are communicatively connected to the host computers 120-122 by the one or more network cards or devices 132 via, for example, the Ethernet connection 130 or any other desired communication network. The network devices 132 may include one or more of a network interface card, a network switch, a router, a firewall, or any other device that facilitates data transmission over the network 130 without changing the underlying data.

As illustrated in FIG. 1, a server 122 is connected to various network devices which may be physically located at any portion of a communication or process control network and within any portion of a process plant, and may include any portion of the security functionality as described herein. In this example, the communication network 130 is typically a closed local area network (LAN) to which only the devices involved in the control system are connected, and may be implemented using hardwired or wireless technology. Moreover, the controllers 110 are communicatively connected to the field devices 140 using any desired hardware and software associated with, for example, standard 4-20 mA device protocols, Ethernet protocols, and/or any smart communication protocol such as the FOUNDATION® Fieldbus protocol (Fieldbus), the HART® protocol, the WirelessHART® protocol, the Profibus protocol, the CAN protocol, etc.

The field devices 140, 143, and 154 may be any type of devices, such as sensors, valves, transmitters, positioners, etc., while the I/O cards 142 may be any types of I/O devices conforming to any desired communication or controller protocol. In the embodiment illustrated in FIG. 1, the field devices 140 are HART or 4-20 mA devices that communicate over standard HART or analog 4-20 mA lines 141 with a modem or I/O card 142 while the field devices 143 are smart devices, such as the FOUNDATION® Fieldbus field devices, that communicate over a digital bus 145 or I/O network with one of the I/O cards 142 using Fieldbus protocol communications. Of course, the field devices 140 and 143 could conform to any other desired standard(s) or protocols, including any standards or protocols developed in the future. Moreover, the field devices 140 and 143 could be wirelessly connected to the controllers 110 via any desired wireless communication protocol, such as the WirelessHART® protocol.

Additionally, one or more of the field devices 154 may be connected to the digital bus 145 via a specialized network device, for example, a gateway 153. For example, the field device 154 may only understand HART commands and the I/O network 145 may implement the PROFIBUS protocol. To this end, the gateway 153 may provide bidirectional PROFIBUS/HART translation.

The controllers 110, which may one or more of many distributed controllers within the plant having one or more processors therein, implement or oversee one or more process control routines. The routines may include one or more control loops that are stored in or associated with the controllers 110. The controllers 110 also communicate with the devices 140, 143 and 154, and with the host computers and servers 120-122 and the data historian or other databases 112 through the network 130 and associated network devices 132 to control a process in any desired manner. It should be noted that any control routines or elements described herein may have parts thereof implemented or executed by different controllers or other devices if so desired. Likewise, the control routines or elements described herein to be implemented within the process control system 100 may take any form, including software, firmware, hardware, etc. For the purpose of this discussion, a process control element can be any part or portion of a process control system including, for example, a routine, a block or a module stored on any computer readable medium. Control routines, which may be modules or any part of a control procedure such as a subroutine, parts of a subroutine (such as lines of code), etc., may be implemented in any desired software format, such as using ladder logic, sequential function charts, function block diagrams, object oriented programming or any other software programming language or design paradigm. Likewise, the control routines may be hard coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controllers 110 may be configured to implement a control strategy or control routine in any desired manner.

Still further, as illustrated in FIG. 1, a further communications network 160 is connected to the server 122 and the workstations 120 and 121 to enable the process control system server 122 and the workstations 120 and 121 to connect to the plant information technology system, to business systems or other networked systems within the plant.

Generally speaking, the workstations and servers 120-122 and the other devices within the network of FIG. 1 implement what is referred to herein as a least privilege based security architecture that (1) operates to isolate or separate the services and other lower level processes executed in the various computing devices of FIG. 1, such as the workstations, servers, databases, controllers, etc., from the desktop applications in various manners, and that (2) restrict the privileges of the services and desktop applications to only those needed by these processes to implement their functionality. This least privilege based security architecture helps to prevent malware from being able to be imported into and instantiated or executed within the process control system devices. In a general sense, the desktop applications and the services or other processes within any computing device may be isolated by partitioning the global namespace of each computer device of the process control system into one or more service namespaces and one or more user (desktop application) namespaces. This partitioning prevents desktop applications from being able to directly access objects (e.g., mutexes) defined in the namespace used by services and prevents services from being able to directly access objects (e.g., in the desktop environment) defined for the desktop namespaces used by desktop applications. Instead, all communications between the various desktop applications and services implemented by the operating system must communicate via well-known and trusted interprocess communications (IPCs) which provide a trusted messaging based communication structure that restricts communications to the device/workstation/server in which the communication is implemented, and thus prevents or reduces the ability of one application or service from corrupting, infecting or interfering with the operation (e.g., memory space of) other applications and services. In this manner, malware introduced via desktop application cannot easily be imported over to a service or other lower level process and vice-versa.

Still further, the security based architecture described herein restricts/limits the ability of malware from being introduced into or spreading within the system by limiting the privileges granted to each service and desktop application to a specified subset of the privileges, such as to a subset of the privileges given to the logged-on user account under which the service or application is run or called. For example, where services that are normally run under an administrator account typically have all of the privileges of the administrator, the new secured software architecture spawns or runs some or all of the services only with the specific privileges needed by the service to perform the function it is designed to perform, and not with all administrator privileges. Still further, services with either communications network access (via a communications network port) or access to removable data storage via a removable memory port (e.g., a USB port), are run under an account with severely limited privileges, wherein these services do not have administrative privileges, do not have local disk (i.e., local memory) storage (write) privileges and cannot communicate directly via the other of the communications network port or the removable memory port. This feature prevents or at least decreases the ability of malware from using a service called by a user with higher privileges from being able to have access to devices or functionality that is not needed by the service itself, thus limiting the ability of malware from infecting other devices or to execute higher privileged commands or services simply because of the logged-on user account under which the service is executed or called.

Likewise, the security features may automatically restrict privileges for applications, such as desktop applications started by logged-on users, to prevent privilege elevation. In some cases, the security architecture may prevent any and all desktop applications from being able to be elevated in privilege, so that a request to a user for elevated privileges will indicate that the application has been infected. In a general sense, privilege elevation by a desktop application (running under the logged-on user account) currently typically requires approval of an authorized user to perform the operation requiring the elevation. Newer operating systems typically enforce this feature by granting applications started by logged-on users, including administrators, only standard user privileges (no elevated/administrator privileges) and requiring elevation in privileges to be specifically authorized by a user. The new architecture could prevent desktop application privilege elevation in any event, thereby providing another level of security that limits the ability of malware from automatically elevating privileges within the system and using this elevation to infect additional processes or devices.

Likewise, the secured architecture described herein may also use access controls that enforce which user accounts and which processes (service or desktop) are authorized to access securable objects through calls to the operating system and its subsystems (e.g., files, mutexes, events), may use mechanisms that prevent lower privileged processes from injecting code into higher privileged processes, and may use group-based accounts, commonly called "groups" to allow privilege/permission inheritance. For example, User A may belong to Group B that belongs to Group C. User A therefore inherits privileges and permissions from both B and C. However, while these privileges are shared or portable on the logged-on user account side, these privileges are not propagated to the services or processes that receive message from the applications run under these accounts, which prevents services and processes (such as those instantiated by the operating system in response to messages received from these applications) from being able to have elevated privileges. Thus, in general, privileges for services and processes spawned or executed by the operating system are defined separately than privileges defined for logged-on user accounts so that the services and processes (and in many cases the applications) run under an account with higher privileges are limited to a subset of privileges, i.e., the least privileges, which are necessary for the intended operation of the service or application or other process.

Figure 2:
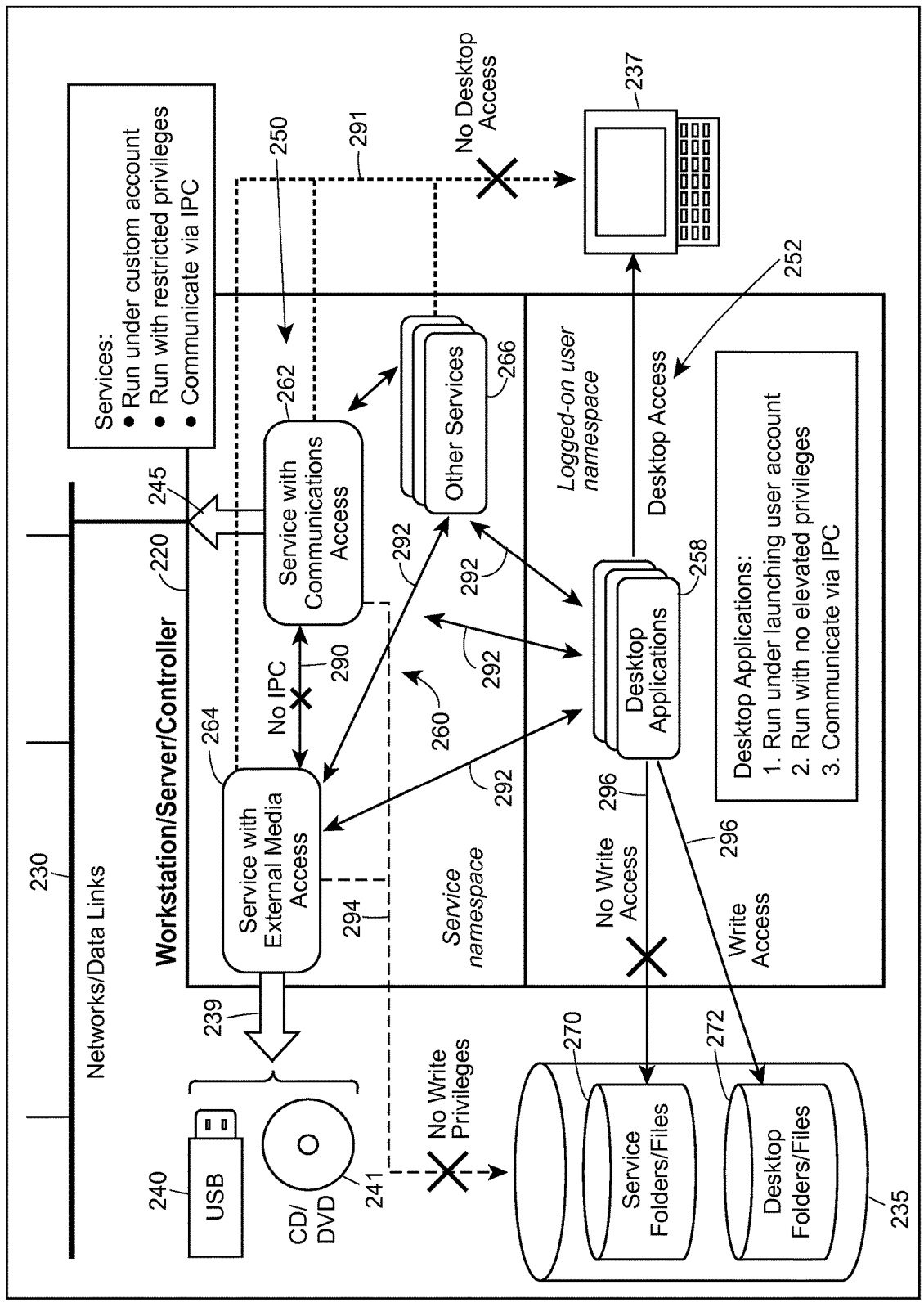
FIG. 2 is an exemplary block diagram of a workstation/server/controller device within a process control plant illustrating various namespace and security restrictions implemented with respect to applications, services and other processes performed in the process control software architecture to implement improved security functions.

In general, with reference to FIG. 2, the security features and secured architecture described herein is illustrated as being implemented in a server or workstation or a controller, such as any of those devices of FIG. 1. However, it will be understood that the security concepts described herein may be implemented in other types of computer devices or machines, such as workstations, database servers, etc., in the same or similar manner. More particularly, FIG. 2 illustrates a workstation/server/controller 220 connected to zero, one or more networks/data links 230, one of which may be, for example, the network 130 of FIG. 1. Moreover, in this case, the server/workstation 220 is connected to one or more local data memories 235 which are illustrated as being internal to or directly connected to the workstation/server/controller 220 in FIG. 2. In addition, the workstation/server/controller 220 may include or be connected to a user interface or display device 237 and includes zero, one or more removable media ports 239. The removable media port(s) 239, through which external or removable memory devices may be connected to the device 220, may include or be any type of memory access port(s) including a USB port, a standard or proprietary connection to a CD or DVD drive, an external hard drive, a flash or solid state memory drive, a magnetic drive, etc. As illustrated in FIG. 2, data, programs, etc. may be provided to or may be exported from the workstation/server/controller 220 via one of the ports 239 via a removable or portable memory device, such a USB flash drive 240, a DVD or CD 241, etc.

Additionally, the workstation/server/controller 220 includes zero, one more communications ports 245, each of which connects to a communications network/data link or communications interface which may be for example, a wired or wireless communications network, such as an Ethernet network, a WiFi network, an Internet protocol network, or any other local area or wide area network or data link.

As further illustrated in FIG. 2, the workstation/server/controller 220 is partitioned into two types of namespaces including a service namespace 250 and zero, one or more logged-on user namespaces (illustrated in FIG. 2 as a single logged-on user namespace 252). Of course, there could be a different logged-on user namespace (also referred to herein as a user namespace) for each different one of multiplicity of users logged into the workstation/server/controller 220 and some devices, such as servers, may have no logged-on user namespaces. As further depicted in FIG. 2, a set of desktop applications 258 exist in and run in the user namespace 252, while services 260 exist within and execute within the service namespace 250. Generally speaking, the desktop applications 258 are processes that are executed in a user namespace, while service processes, referred to herein simply as services, are processes that run independently of the logged-on user and are spawned or run by the operating system (or one of its agents such as the Windows Service Control Manager), typically in response to configuration settings, calls to the operating system or request messages sent to them (e.g. a Windows COM/DCOM message). Detached processes are independent processes that are executed in the same namespace as the process that starts them (e.g., a service process or a desktop application process). As an example, detached processes could be started in the service namespace and can be the processes that implement USB or other local data storage device reads or that interface with a communication network in the manner described herein. While services 260 are typically started automatically, these processes may be started in response to a request message sent by a user process or another service. However, as described in more detail herein, the services 260 always run under a specified account, independent of the user account of the process that starts them, and independent of how they are started, while detached processes run or execute under the account of the process (e.g., a service or a desktop application) that starts them. Of particular note, the services 260 in FIG. 2 may include zero, one or more service namespace processes with network access 262 (via one of the communication ports 245), service namespace processes with access to a removable storage device 264 via an external media port 239 and other service namespace processes 266 which neither have portable or local memory access nor communications network access. Still further, the local data storage device or memory 235 includes various types of files or folders including service files or folders 270 which are created and used by the service namespace processes 260, and desktop files or folders 272 which are created and used by the logged-on user namespace processes, e.g., by the desktop applications 258.

As will be understood from FIG. 2, the workstation/server/controller computing environment is thus separated into multiple sub-spaces with different namespace rules associated with a separate namespaces for each of logged-on users (or groups of users), and services (or detached processes spawned by services), with these rules being enforced by the operating system and its configuration data. The partitioning of the global computing environment namespace into service and logged-on user (desktop application) namespaces prevents desktop applications from directly accessing objects (e.g. mutexes) defined in the service namespace and prevents service namespace processes from directly accessing objects (e.g. the desktop) defined for the logged-on user namespaces (used by desktop applications). In this manner, services and desktop applications must communicate (that is, are forced to communicate) with one another or through one another to reach the objects created in each of those different namespaces. This feature prevents malware that may be present in a service or in a desktop application in one environment from creating or using objects in the other of the namespaces without going through a respective service or application in the other namespace, which will generally limit the malware from being able to corrupt other services or applications. This feature, for example, limits the ability of malware from creating or infecting objects in the other environments, which limits the ability of malware to be set up in and propagate to the control system via, for example, the communications network 230.

The secured software architecture described above operates in various manners to increase the overall security of the workstation/server/controller 220 used in the plant or other industrial automation system. This security mechanism, which is generally applied to all computer devices or machines in the control system including machines that execute processes/applications developed by third parties (as well as processes/applications developed by or provided by the control system vendor), is constructed to implement a number of rules or features.

Some of the rules described herein and enforced by the configuration of the operating system of the workstation/server/controller 220 apply to all processes that require elevated privileges, network access, local disk write access or that have access to portable or removable memory devices (e.g. USB memory devices, smart phones, CD/DVD drives). These processes include, for example, the processes 262 and 264 of FIG. 2. In particular, these process (1) are executed as services or are spawned by services, (2) are executed under custom (not standard/default) accounts that belong to custom groups/roles, (3) are granted access to only the resources that are needed, (4) are explicitly denied access to resources not explicitly needed, (5) are granted only the privileges they need to operate, (6) do not have impersonation privileges that allow a process running under another account to change accounts to this custom account, and (7) do not have delegation privileges that grant the authority to another running process to run under this custom account. Moreover, if these processes have network access, or access to portable or removable memory devices, these process do not have elevated privileges nor have the ability to write to the local memory storage (e.g., disk).

Likewise, these processes communicate with each other via trusted local interprocess communications (e.g., WCF named pipes, COM, etc.), with the exception that processes that require network access are not permitted to communicate directly with processes that have access to portable or removable memory devices and vice-versa. This exception, which is illustrated in FIG. 2 by the line 290, is implemented to protect against the forwarding of malware read from a portable memory device to the communications network, and the storing of malware received from the communications network to a portable or removable memory device.

Additionally, as illustrated by the dotted line 291 in FIG. 2, none of the processes 260 (e.g., processes 262, 264, 266) have direct access to the desktop namespace 252 or objects in the desktop namespace 252. As a result, these processes provide services (and in particular privileged services) to desktop applications 258 only via trusted local interprocess communications 292, which are illustrated by the lines going between the services 260 and the desktop applications 258 in FIG. 2.

Moreover, all processes that require network access, or that have access to portable or removable memory devices (e.g., the processes 262 and 264 of FIG. 2) execute or run under an account that (1) does not have command shell access, (2) does not have access to programs that change the security configuration (policy settings and accounts) of the workstation/server/controller 220 and (3) are restricted from performing file system writes, which feature is illustrated by the dotted line 294 of FIG. 2. As a result, only the services 266 which do not have network access (e.g., via the port 245) or portable or removable memory access (e.g., via the port 239) are able to perform file system writes to the data files 270 within the database 235.

Still further, there are various security features that are implemented in the desktop environment 252. In particular, all desktop applications, also referred to as interactive applications/processes, run or execute without elevated privileges no matter what user or logon account was used to start or call these applications or processes. Thus, in the case where a user with administrative privileges starts a desktop application, this desktop application is still executed with restricted operating system privileges equivalent to a standard user, independent of the launching user's privileges. Still further, as noted above, the desktop applications 258 are not capable of directly accessing the communications network 230, but must instead communicate via an interprocess communication with a service 262 in the service namespace 250 that provides communications network access. Likewise, the desktop applications 258 are not capable of directly accessing the portable memory devices 240, 241, but must instead communicate (via an interprocess communication) with a service 264 that provides access to these devices. Additionally, the desktop applications 258 are restricted from accessing directories and files owned by the system or that can compromise the performance/operation of the system if infected. Thus, as illustrated by the lines 296 of FIG. 2, desktop applications 258 can write to desktop folders and files 272 but cannot write to service folders and files 270. Additionally, the desktop applications 258 are designed to never require elevated privileges and cannot be elevated, independently of the launching user privileges. Likewise, desktop applications 258 can never impersonate another user and must communicate with each other via trusted local interprocess communications.

Still further, all user identities are passed between services and processes 260, and desktop applications 258 via digitally signed identity claims, and such identity claims follow or flow along with the communication and through the various processes and network devices to enable verification of process control system permissions. For example, a process control system operator may make a request (via a desktop application) such as to write a parameter (e.g., a setpoint) in a process control device such as a controller. This request may require various services to be called or spawned during the process of sending this request via a communications network to the process control device that is to implement the write. The user identity claims flow along with the request through the various processes used to create and forward the request via the various machines in the process control network, so that the process control device implementing the change can verify that the request is from a user with the appropriate permissions for making the change and can thus check and log the change close to the process where the write operation is performed. This feature ensures that the human user performing an operation is accurately and correctly identified without the use of impersonation and/or delegation. Moreover, this feature enables desktop applications or a process started by a desktop application, such as process control applications, to be started in the context of the logged-on user and continue to operate through shift changes without needing to be restarted by another user because shift changes do not require the logged-on user to log-off. Instead, the new shift operators identify themselves to the process control system without having to log-on to the operating system. In this manner, all desktop applications will run with the privileges of the logged-on user, and so it does not matter which operator starts a desktop application, so long as new operators identify themselves when using the application to enable the proper identity claim to flow along with process operation requests. Moreover, without this mechanism, the service/process/application would only be able to identify the user with the account under which it runs or from which it was called. In control systems this feature is also important because the current user of an operator console may not be the user that logged on. This restriction removes the danger of having a stolen logon user identity that is used in the determination of operating system privileges and access control permissions from being used to determine access control permissions used to provide access to control system resources (e.g., parameters and alarms).

One methodology of implementing the security features described above with respect to FIG. 2 is to use a more restrictive methodology of defining the privileges and permissions that are granted to various applications and services within a standard, open architecture operating system based control system. In particular, currently, privileges and permissions are typically defined for users on a user by user basis, so that some users have more privileges and permissions than others. In this architecture, applications (e.g., desktop applications and the processes started by them) are generally granted the privileges and permissions of the logged-on user account from which these applications or processes were started or called. On the other hand, many services (e.g., processes that are spawned based on configuration settings, or in response to calls from applications or requests from users to the operating system to start them, or to handle incoming messages) are granted the privileges of the operating system account under which they are configured to run. As a result, all privileges and permissions or services are controlled by the accounts in these systems.

More particularly, desktop applications are always started under the account of the logged-on user, while services and the process are always started under the account configured for them, and processes started by other processes are always started using the account under which the process that starts them is running. It is often the case, therefore, that services are run under standard OS service accounts or under user accounts.

To the contrary, the secured architecture of FIG. 2 defines privileges and permissions for services separately from the privileges and permissions defined for the logged-on user accounts and so does not allow services to run under user accounts that have the interactive log-on privilege. That is, services will always run under a specific service account that does not have the interactive log-on privilege. In particular, the secured architecture of FIG. 2 may define what are referred to herein as custom service accounts that have different or limited sets of privileges and permissions, and each of the services 260 of FIG. 2 may be assigned to one or more of these custom service accounts for the purposes of assigning the privileges and permissions for these services. Each service is assigned to a custom service account that has a least set of privileges that the service needs. Services should not be assigned to custom service accounts that have more privileges than are needed for the operation of the services. However, to reduce the proliferation of custom service accounts, a service can run under a custom service account that has more privileges than it needs only if it configured with a restricted service set that restricts the privileges inherited from the custom account to only those that it needs. In some cases, such as with services that access the communications ports or the external media ports, services may be assigned to the least privilege account with a further restriction that these services cannot write to local data storage (disk). On the other hand, desktop applications run with the privileges of the launching user, but should always be started with the restricted standard user privileges and elevated only when they need elevation, and then only with approval of the user. If the user does not have the necessary privileges, then a user with those privileges should be required to approve the elevation. In this manner, services and applications may have a limited set of privileges, which limits the ability of malware from infecting a control system using this architecture.

Generally speaking, the custom service accounts (and the privileges for these accounts) may be defined, and then assigned to services, which may further restrict the custom accounts privileges, so that the services have only the privileges or permissions that the services need to perform the tasks or functions for which they are designed.

Figure 3:
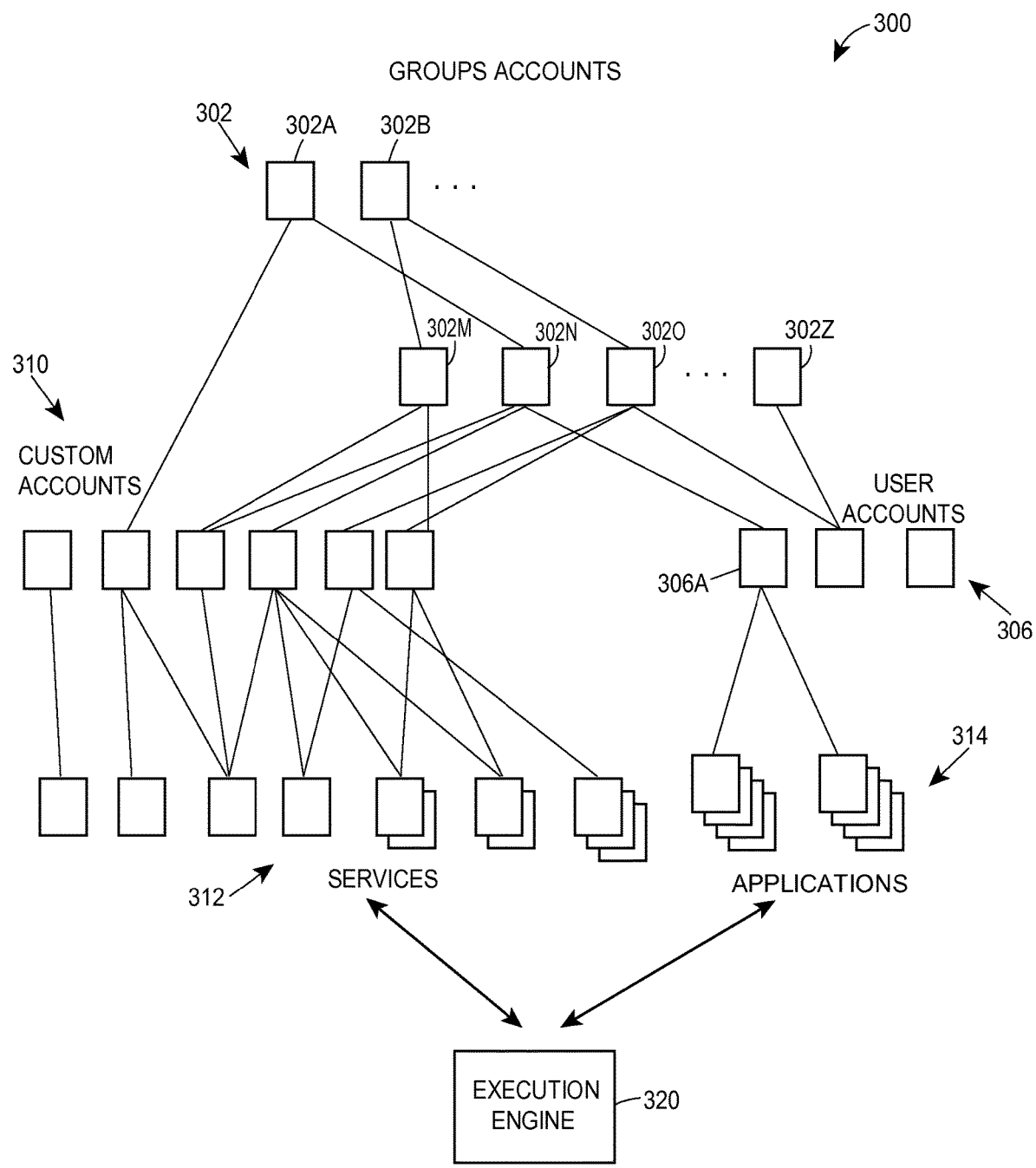
FIG. 3 illustrates a diagram of accounts including group accounts and custom accounts that define sets of privileges associated with various different applications and services according to the least privileges software security architecture described herein.

FIG. 3 illustrates a block diagram 300 of an example interrelationship or association of user accounts 306 that permit user log-on and custom service accounts 310, which accounts may be used to configure or provide operating system privileges and permissions to services 312 and desktop applications 314 and other processes apart from or separate from the permissions and privileges associated with the process control system permissions defined for user logged-on accounts.

As illustrated in FIG. 3, a set of user accounts 306 are defined and, as indicated by the dotted lines between the user accounts 306 and the group accounts 302, each user account 306 may belong to one or more of the group accounts 302. In this manner, each user account 306 will inherit the operating system privileges and permissions of any group account 302 with which it is associated or to which it belongs and then pass those privileges/permissions on to desktop applications when started by the associated logged-on user. As also illustrated in FIG. 3, a user account 306 may belong to and thus inherit the privileges and permissions of multiple group accounts 302, which can also belong to and inherit from other group accounts 302. Likewise, as illustrated in FIG. 3, a set of custom service accounts 310 is also established, each having various different operating system privileges and permissions (including access permissions) within the operating system to take actions, such as communication privileges, read/write privileges, access privileges, etc. Each custom service account 310 can belong to and thus inherit the privileges of one or more group accounts 302. Each of various services 312 and the processes started by them within a computer device is assigned to one (or possibly more than one) of the custom service accounts 310 and inherit or have the operating system privileges of the custom service account(s) 310 to which these services 312 belong. In a general sense, the operating system privileges and permissions provided for each custom service account 310 are defined separately and apart from the user accounts 306. In particular, the privileges and permissions of the custom accounts 310 should be tailored (restricted) specifically for services 312 and processes they start (e.g., detached processes, subordinate processes) and should have only the operating system privileges and permissions necessary for the service 312 and the processes it starts to operate to perform its intended function, and no more, unless the service/process is configured to further restrict the privileges inherited from the custom service account.

With the use of user accounts 306 and custom service accounts 310, the service namespace processes 312 (i.e., the operating namespace in which services and the processes that they start are run) and the desktop namespace processes 314 (i.e., the operating namespace in which the desktop applications and the processes that they start are run) may be associated with different custom accounts 310 or user accounts 306, so that services called by a desktop application may execute having different privileges than the calling desktop application. The phrase "called by a desktop application" refers to the receipt of a remote procedure call message by a service that was sent by a desktop application.

Furthermore, as illustrated in FIG. 3, at a higher level, a set of group accounts 302 may be established to define a specific set of the operating system privileges and permissions (including access permissions). Group accounts can be associated with zero, one or more custom service or user accounts within a computer device or within the process control plant or system as a whole (e.g., using Active Directory). Each group account 302 may include a specific set of operating system privileges and permissions (including access permissions) that can be inherited by other group accounts, custom service accounts and/or user accounts that are members of the group account 306. Inheritance is achieved by making these accounts members of the group account. Thus, custom accounts 312 and user accounts 306 may belong to the same group 302 and therefore inherit the same operating system privileges and permissions. The group accounts 302 are thus different than roles typically used in process control systems to define process control (as opposed to operating system) privileges and permissions. Process control roles (as opposed to operating system groups) tend to include groups of individuals (operators, configuration engineers, technicians, etc.) responsible for particular areas or functions of a plant. While such different roles may define different process control system privileges and permissions for these people, people assigned to different roles often run under the same user log-on account, and have the same set of operating system privileges and permissions, but different process control system privileges and permissions. In any event, as will be understood, the group accounts 302 define operating systems privileges and permissions that can be inherited by custom service accounts 312 used to run service namespace processes and/or user accounts 306 and the desktop namespace process started by their logged-on user.

Thus, FIG. 3 illustrates a grouping of various services 312 and applications 314 under various accounts 302, 306 and 310, which are used to assign operating system privileges for the services and applications. The custom service accounts 310 illustrated in FIG. 3 are only used for service processes 312 and other processes in the service namespace and the user accounts 306 are used only for the processes (e.g., applications 314) in the desktop namespace. In a general case, all of the processes (e.g., desktop applications 314) in the desktop namespace start with the privileges of the "standard user" account 306A (the least privilege account) that does not include administrator privileges. Moreover, the custom accounts 310 are defined with only the additional privileges they need. However, as illustrated in FIG. 3, more than one service 312 can run under the same custom service account 310 and be individually denied some of its privileges if the service 312 does not need all the custom service account privileges. However, for those services with a communication port or external media port (e.g., USB port) access, the services are run under a custom service account with no elevated (e.g., administrator) privileges and a further restriction that these services cannot write to local (internal) data storage or disk. Here it is understood that local or internal data storage is intended to mean data storage that is connected in the computer device in a relatively permanent manner and is intended not to be portable or easily removable in nature and is thus not connected via an external media access port. Local memory or data storage will generally include internal disk drives or internal random access memory.

Thus, as will be understood from the discussion provided above, operating system privileges including access permissions are granted to a process (e.g., a service or a desktop application) completely independently of access controls used to grant/deny a user access to process control system objects (e.g. setpoints, temperature & pressure measurements, and alarm limits). Access to process control objects requires a separate user identity to be passed with requests to allow process control devices to verify process control system permissions, because the operating system that enforces access permissions and operating system privileges knows nothing of control system objects. As is known, control systems, in general, have a separate user manager that defines what each control system user is able to access in the control system and the user identity claims are provided to enable this separate user manager to operate properly.

In any event, using this architecture, the permissions and privileges that a user has to access process control objects, to perform actions within the process plant, etc., are not related to the privileges and permissions of the services and applications that run under custom service accounts or user logged-on accounts. This feature lessens or eliminates the ability of an infected process from being able to use the operating system privileges and permissions inherited from the custom service account or the user account under which the infected process is running to access or disrupt the execution of process control objects.

As further illustrated in FIG. 3, the execution engine 320 (e.g., the operating system execution engine) of the computer on which a process (e.g., a service or an application or a process started by a service or an application) is to be executed, grants privileges for services 312 or applications 314 or processes that they start using the following rules. Processes started directly by the logged-on user get the standard set of user privileges and permissions associated with the standard user account, even if the user has elevated privileges (i.e., an administrator). Services started by the operating system get the privileges and permissions of the custom service accounts to which they belong, reduced by any restrictions configured for the service. Processes started by a process gets the current set of privileges and permissions of the starting process. This organization enables each process (e.g., each service 312 or application 314 or the process started thereby) to run or execute with the least set of privileges needed to perform the specific functionality of the process. This functionality thus limits the ability of malware that infects a service 312 or an application 314 or a process started thereby from being able to take actions (e.g., have operating system privileges or permissions) that the service 312 or application 314 does not need for its normal operation, and thus limits the ability of malware to operate within the computer device or to propagate within the process control system network to other process control system devices or other computer devices. Still further, the execution engine 320 may not allow or may prevent privilege escalation within desktop applications 314 or services 312 to prevent malware from being able to defeat this operating system privilege construct.

Figure 4:
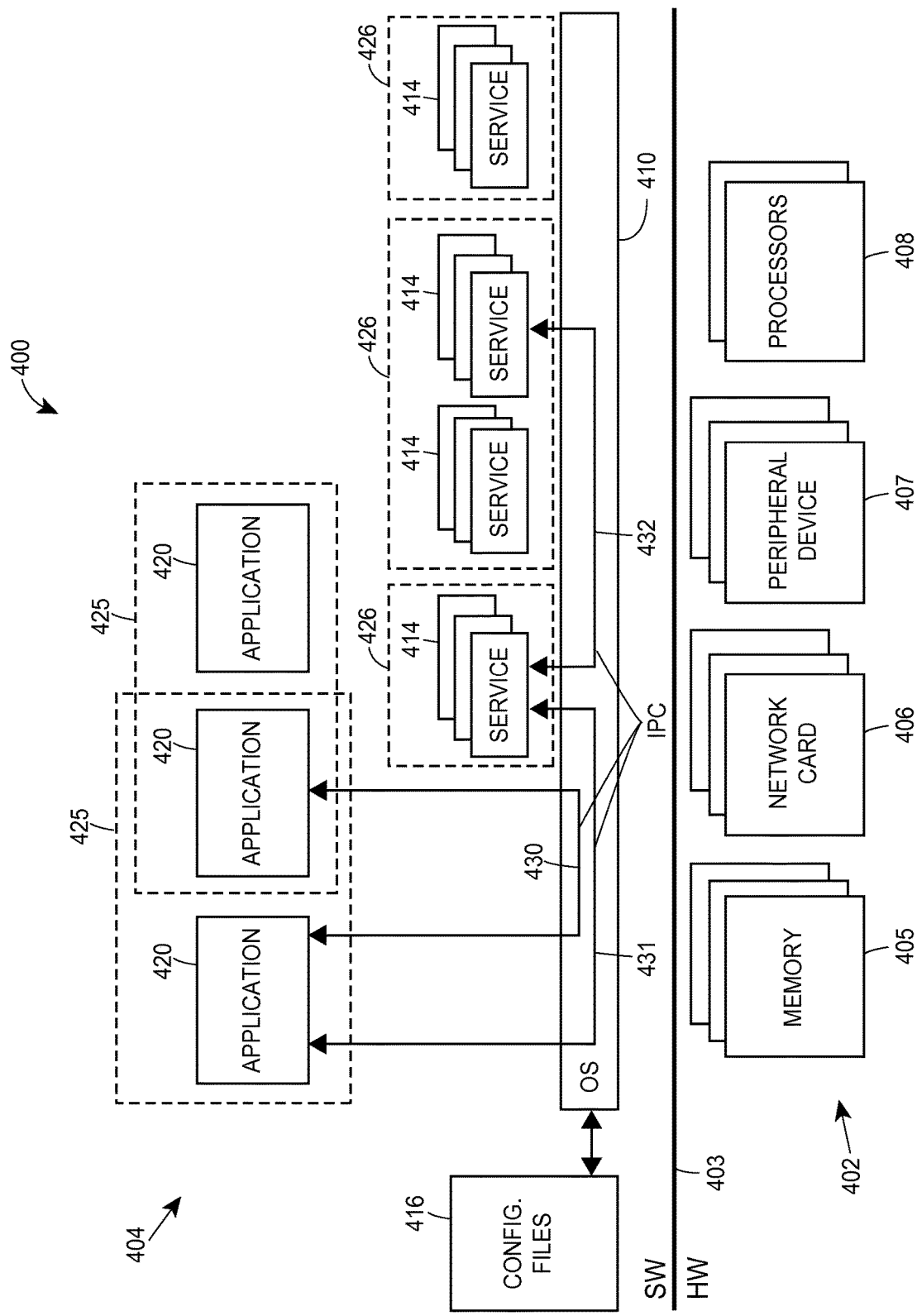
FIG. 4 is an exemplary architectural diagram illustrating the software and hardware components of one of the workstations of the system of FIG. 2 illustrating the communication connections between various services and applications using the accounts of FIG. 3.

FIG. 4 illustrates a schematic diagram of a computer system 400 that may implement the rules or configuration features described above with respect to increasing the security of a computer device or plant network to limit the spread of or likely infection by malware. In particular, as illustrated in FIG. 4, the computer system diagram 400 is divided into a hardware system 402 having various hardware components (below a solid line 403) and a software system 404 having various software/firmware components (above the solid line 403). It will be understood that the software/firmware components of the software system 404 are implemented in one or more computer processors and memory devices (not shown in FIG. 4), associated with the computer system or device 400.

As illustrated in FIG. 4, the hardware system 402 may include one or more memory devices 405, such as databases, internal local memories, hard drives, flash drives, RAM, ROM, etc. These memories 405 may include the local data memory 235 and the data files 270 and 272 of FIG. 2. The hardware system 402 may also include one or more network cards or ports 406 which may connect the software system 404 to one or more external communication networks via network ports, such as the network port 245 of FIG. 2. Likewise, the hardware system 402 may include one or more peripheral devices 407, such a user interfaces (e.g., the user interface 237 of FIG. 2), printers, keyboards, mouse devices, external memory drives (connected via for example, an external memory port 239 of FIG. 2), etc. Of course, any other peripheral devices or device ports or connections may be included in the hardware system 402 instead or in addition to those specifically described herein. Still further, the hardware system 402 may include one or more processors 408 on which the operating system and the processes described herein are executed.

As illustrated in FIG. 4, the software system 404 includes an operating system (OS) component 410, services or other processes 414 and a set of configuration information or configuration data 416 (e.g., a Windows registry, etc.) which may be used to configure the operation of the software system 404 in the manners described herein. In this case, service processes 414, referred to herein simply as services 414, are processes that run independently of the logged-on user and are generally run in response to calls or commands to the OS 410 or messages conveyed by the OS 410 to a service process 414. That is, the services 414 are generally spawned or run under control of the OS 410 or an agent of the OS 410 (e.g., the Windows Service Control Manager). While these processes are typically started automatically, they may be started in response to a request message sent by a desktop application. However, in both cases, as indicated above, these services always run under a specified custom service account, independent of who or what process causes these services to start. Additionally, the software system 404 of FIG. 4 includes various desktop applications 420. As will be understood, applications are typically started by and available to various logged-on users and run under those users' accounts 425 (illustrated by the dotted lines in FIG. 4). Therefore, unlike services that always run under the same custom service account, applications run under different user accounts (the currently logged-on user account) as indicated above. Of course, the applications 420 may be the desktop applications 258 of FIG. 2 and the user accounts 425 may have different privileges and rights as is typical or may all have the same operating system privileges and permissions, such as those associated with or defined for a standard user, which will generally have the lowest level or set of operating system privileges and permissions. Importantly, the configuration information 416 may include registries and other configuration information that defines the configuration of the OS 410 to operate in the manners described above or to implement the rules described above with respect to FIG. 2. In this case, the configuration information 416 may define account information that contains privileges, may define access control lists that associate an account with an OS resource and define access permissions for the account, and may define information that allows inherited account privileges to be restricted at runtime. In this latter case, the service/application is started with the set of account privileges that have been reduced as specified by the configuration information. However, this type of configuration information does not add privileges to those inherited from the account, it only reduces these privileges. The configuration information may be created and/or provided as part of the configuration activities provided by the control system supplier or the configuration engineer so that the configuration information may be preset to specify which operating system privileges are associated with and provided to (e.g., needed by) each of the services 414 and applications 420 via user accounts, group accounts, and custom service accounts. Likewise, certain users, such as administrators, may change the configuration information 416 to add new accounts, define new privileges, etc. Moreover, similar configuration information may be created for the desktop applications and may be provided by a configuration engineer during the configuration process, or by the application provider (e.g., a third party provider of the desktop application), or may be set by default to a minimal level of privileges or may be set up by an administrator.

As illustrated in FIG. 4, the OS 410 uses the configuration information 416 to control the operating system privileges and thus the permissions and capabilities of the various applications 420 (which may communicate with the OS 410 via APIs 412 or directly), and the services 414 to enforce the least privileges security features described above. Thus, the OS 410 uses the configuration information (generally account management information is stored in a database or file such as an active directory, a Workgroup configuration file, a .exe specific configuration file, etc.) and uses the partitioned namespaces to enforce the requirement that the applications 420 communicate with each other only via IPCs (illustrated by the line 430 of FIG. 4), that the applications 420 communicate with the services 414 only via IPCs (illustrated by the line 431 in FIG. 4) and that the services 414 communicate with other services 414 only via IPCs (illustrated by the line 432 in FIG. 4). Likewise, the OS 410 (or the execution of the applications/services in the manner described herein) may use the configuration information 416 to prevent certain services from communicating with other services (e.g., to prevent a service with network access from communicating with a service with external media access), to prevent the applications 420 from writing to service files and folders stored on local or internal storage devices (e.g., files 270 of FIG. 2), to prevent any services from writing to desktop folders (e.g., files 272 of FIG. 2) or from accessing the desktop in any other manner, and to prevent any services with network or external media access from writing to service files or folders (e.g., files 270 of FIG. 2). As will be understood, one manner of the OS 410 enforcing these rules is by tightly controlling the operating system permissions or privileges of the various accounts and the services and applications associated with the various accounts in the configuration files of the configuration module 416.

As will be understood, the objective of this overall design illustrated in FIGS. 2-4 is to partition (isolate) the services, applications and other processes that run in the automation system workstations and servers or other computer devices of, for example, a process control network, for the purpose of isolating an infection to keep it from persisting itself, so that the infection disappears on reboot, to reduce its ability to propagate, to reduce the damage the infection can perform by not allowing the infection to gain elevated privileges, and by restricting the privileges of the communication interface services and the external or external media port handler processes. Using these rules, if a service or other process spawned by a service becomes infected, (1) the infected service or process will not have elevated privileges because the service or process is running with restricted privileges, (2) the infected service or process will not have permissions to access resources that it does not directly need, and (3) the infected service or process with not be able to persist itself through reboots. In particular, the services that have communication network access and external media port (e.g., USB port) access have restrictions on what they can do, and because these services are the only avenues through which infections can enter the machine, limiting what these particular services can do (e.g., preventing these services from writing to local memory storage or disk, to be able to run elevated privileges, from accessing the desktop directly, from propagating infections between portable/external media and communications networks/data links, etc.), if infected, prevents spreading an infection within the computer device or the network. As a result, the infection become automatically quarantined, and restarting the service clears the infection. For services that execute only when accessed (e.g. COM/DCOM services), the calling process gets a clean copy of the service at each new call, thereby wiping out any infection in the service.

Likewise, using these rules, if a desktop application becomes infected, the application will not be able to directly access privileged functions of the operating system OS), nor will the application be able to write to the network or a portable memory device. Instead, the application will have to request (via IPCs) actions to be performed on its behalf by services and their processes that are designed to validate and provide an additional level of access control to privileged functions and resources.

As a result, some of the key benefits realized from this architecture include protection from processes with network or portable memory device access, if these process become infected with malware, from being able to use administrative privileges to attack the system, from having access to resources available to commonly used/standard accounts, from writing to the file system, and from propagating the malware from a portable memory device to the network and vice-versa. This architecture also provides protection from having a desktop application directly access trusted or restricted resources (e.g. local data file) or from using elevated privileges, thus limiting the exposure of the system to malware if the desktop application becomes infected with malware. Additionally, this architecture allows the processes of the control system to run under operating system accounts that have only the operating system/file system privileges and permissions they need, while allowing them to access control system resources using user identity claims.

While the security techniques described herein have been described herein as being used in conjunction with networked process control devices and systems using Fieldbus and standard 4-20 ma devices, they can, of course, be implemented in any type of control device using any other process control communication protocol or programming environment and may be used with any other types of devices, function blocks or controllers. Moreover, the security techniques described herein can be implemented in any other type of computer device including computer devices that are not part of a process control system. Although the software security architecture features described herein are preferably implemented in software, they may be implemented in hardware, firmware, etc., and may be executed by any other processor associated with a computer device. Thus, the methods described herein may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A computer device including:
    a memory adapted to store non-transitory operating system configuration data and data for a plurality of custom service accounts;
    a processor;
    and an operating system that executes on the processor according to the configuration data to execute
    (i) a plurality of desktop applications having respective application privilege sets in a desktop namespace on the computer device, the desktop applications being operable on behalf of a plurality of user accounts having respective user privilege sets,
    (ii) a plurality of services that each have a respective preset set of operating system privileges associated therewith, each of the plurality of services granting access to a respective limited subset of resources defined in a service namespace in which the plurality of service processes execute,
    and (iii) to provide respective pluralities of services from the plurality of services to each of the plurality of desktop applications, the service namespace being partitioned from the desktop namespace on the computer device,
    wherein during startup of the computer device the operating system:
        reads the configuration data and the data for the plurality of custom service accounts,
        creates each of the plurality of custom service accounts according to the data,
        for each of the plurality of custom service accounts, creates, according to the operating system configuration data, a corresponding set of operating system privileges,
        creates the plurality of services, and
        prior to the execution of the plurality of services as a plurality of service processes by the operating system during runtime of the computer device:
            assigns, according to the configuration data, each of the plurality of services to one of the plurality of custom service accounts and the corresponding set of operating system privileges, and
            for each of the plurality of services, create a corresponding process and assign the each of the plurality of services and the corresponding custom service account of the each of the plurality of services to the corresponding process to yield a corresponding service process to yield a plurality of service processes running during runtime;
    wherein for each of the plurality of running service processes, the operating system enforces the corresponding respective operating system privileges of the correspondingly assigned custom service account to prevent the each running service process from obtaining any of the respective application privilege sets or any of the respective user privilege sets, such that
        (1) upon a first one of the plurality of desktop applications requesting execution of a first service process from among the plurality of service processes while operating on behalf of a first one of the plurality of user accounts, the operating system requires that the first service process be executed under the operating system privileges of the correspondingly assigned first one of the plurality of custom service accounts to which the first service process was assigned, rather than under the privilege set of the first desktop application or the privilege set of the first user account so that the first service process is limited to access only the corresponding granted respective limited subset of resources, and
        (2) upon a second one of the plurality of desktop applications requesting execution of the first service process while operating on behalf of a second one of the plurality of user accounts, the operating system requires that the first service process be executed under the operating system privileges of the correspondingly assigned first one of the plurality of custom service accounts, rather than under the privilege set of the second desktop application or the privilege set of the second user account so that the first service process is limited to access only the corresponding granted respective limited subset of resources.

2. The computer device of claim 1, wherein the computer device further includes one or more communications ports and a local memory storage unit, and wherein each of one or more service processes that are capable of communicating with a communications port does not have privilege to write to the local memory storage unit.

3. The computer device of claim 2, wherein the computer device further includes an external media port, and wherein one or more of the service processes that are capable of communicating with a communications port do not have privilege to communicate with a removable storage unit via the external media port.

4. The computer device of claim 2, wherein the computer device further includes an external media port, and wherein one or more of the service processes that are capable of communicating with the communications port do not have privilege to communicate directly with a further one or more of the service processes that have privilege to communicate with a removable storage unit via the external media port.

5. The computer device of claim 4, wherein the computer device further includes an external media port and a local memory storage unit, and wherein one or more of the service processes that are capable of communicating with a removable storage unit via the external media port do not have privilege to write to the local memory storage unit.

6. The computer device of claim 5, wherein the computer device further includes a communications port, and wherein one or more of the service processes that are capable of communicating with a removable storage unit via the external media port do not have privilege to communicate directly with a further service process that has privilege to communicate via the communications port.

7. The computer device of claim 1, wherein the operating system enforces a requirement that communication between processes running in the desktop namespace and processes running in the service namespace must be implemented via interprocess communications.

8. The computer device of claim 1, wherein the operating system executes on the processor according to configuration data to implement desktop processes, wherein the configuration data causes each of the desktop processes to be assigned to one of one or more user accounts that each have a preset set of operating system privileges associated therewith, wherein the preset set of operating system privileges for each the one or more user accounts includes interactive logon privileges.

9. The computer device of claim 8, wherein the one or more user accounts include one or more standard user accounts, and wherein the set of operating system privileges assigned to standard user accounts does not include elevated or administrative operating system privileges.

10. The computer device of claim 8, wherein the set of operating system privileges assigned to desktop applications when they are started are restricted to a set of operating system privileges associated with standard user accounts, even if the user account under which the desktop application is started has elevated operating system privileges, and wherein processes started by processes running in the desktop namespace inherit the privileges of the starting process.

11. The computer device of claim 8, wherein the operating system enforces a rule that processes running in the desktop namespace cannot be elevated in operating system privileges without explicit authorization of an authenticated user whose account has the elevated privileges.

12. The computer device of claim 1, wherein the operating system enforces a requirement that communication between processes running in the service namespace and other processes running in the service namespace must be implemented via interprocess communications.

13. The computer device of claim 1, wherein the computer device further includes a local memory storage unit that stores service files or service folders, and wherein the operating system enforces a rule that prevents processes running in the desktop namespace from writing to service files or service folders stored in the local memory storage unit.

14. The computer device of claim 1, further including a desktop in the desktop namespace, the desktop including a user interface, and wherein the operating system enforces a rule that prevents any of the service processes from directly accessing the desktop.

15. The computer device of claim 1, wherein messages originating at desktop applications include user identity information that identifies a user of a desktop application, and wherein the user identity information follows messages through multiple processes to their final destination, including through a service process that accesses the communications port to send the message via a communications link.

16. The computer device of claim 15, wherein at least either of (i) operating system privileges or (ii) access permissions associated with one or more processes used to forward the message to a message recipient are independent of the user identity information, and wherein the user identity information does not control the access permissions to process control objects.

17. A computer device comprising: a processor; a memory adapted to store non-transitory operating system configuration data and data for a plurality of custom service accounts; a communications port; a local memory storage unit; and an operating system that executes on the processor according to the configuration data to execute
  (i) a plurality of desktop applications having respective application privilege sets in a desktop namespace on the computer device, the desktop applications being operable on behalf of a plurality of user accounts having respective user privilege sets,
  (ii) a plurality of services that each have a respective preset set of operating system privileges associated therewith, each of the plurality of services granting access to a respective limited subset of resources defined in a service namespace in which the plurality of service processes execute,
  and (iii) to provide respective pluralities of services from the plurality of services to each of the plurality of desktop applications, the service namespace being partitioned from the desktop namespace on the computer device,
  wherein during startup of the computer device the operating system:
    reads the configuration data and the data for the plurality of custom service account, creates each of the plurality of custom service accounts according to the data, for each of the plurality of custom service accounts, creates, according to the operating system configuration data, a corresponding set of operating system privileges, creates the plurality of services, and prior to the execution of the plurality of services as a plurality of service processes by the operating system during runtime of the computer device:

assigns, according to the configuration data, each of the plurality of services to one of the plurality of custom service accounts and the corresponding set of operating system privileges, and for each of the plurality of services, create a corresponding process and assign the each of the plurality of services and the corresponding custom service account of the each of the plurality of services to the corresponding process to yield a corresponding service process to yield a plurality of service processes running during runtime;

wherein for each of the plurality of running service processes, the operating system enforces the corresponding respective operating system privileges of the correspondingly assigned custom service account to prevent the each running service process from obtaining any of the respective application privilege sets or any of the respective user privilege sets, such that (1) upon a first one of the plurality of desktop applications requesting execution of a first service process from among the plurality of service processes while operating on behalf of a first one of the plurality of user accounts, the operating system requires that the first service process be executed under the operating system privileges of the correspondingly assigned first one of the plurality of custom service accounts to which the first service process was assigned, rather than under the privilege set of the first desktop application or the privilege set of the first user account so that the first service process is limited to access only the corresponding granted respective limited subset of resources, wherein the corresponding set of operating privileges of a second one of the plurality of custom service accounts assigned to a second service process from among the plurality of service processes includes permission for writing to the local memory storage unit, and wherein the corresponding set of operating privileges of the first one of the plurality of custom service accounts includes permission for communicating with the communications port and does not permit writing to the local memory storage unit such that the first service process executing under the first one of the plurality of custom service accounts is capable of communicating with the communications port and cannot write to the local memory storage unit, and (2) upon a second one of the plurality of desktop applications requesting execution of the first service process while operating on behalf of the second one of the plurality of user accounts, the operating system requires that the first service process be executed under the operating system privileges of the correspondingly assigned first one of the plurality of custom service accounts, rather than under the privilege set of the second desktop application or the privilege set of the second user account so that the first service process is limited to access only the corresponding granted respective limited subset of resources.

18. The computer device of claim 17, wherein the local memory storage unit stores service process files or service process folders.

19. The computer device of claim 18, wherein the local memory storage unit further stores desktop files.

20. The computer device of claim 17, wherein the computer device further includes an external media port, and wherein the first service process that is capable of communicating with the communications port does not have privileges to communicate with a removable storage unit via the external media port.

21. The computer device of claim 17, wherein the computer device further includes an external media port, and wherein the first service process that is capable of communicating with the communications port does not have privileges to communicate directly with a further service process that has privileges to communicate with a removable storage unit via the external media port.

22. The computer device of claim 21, wherein the further service process that is capable of communicating with a removable storage unit via the external media port does not have privileges to write to the local memory storage unit.

23. The computer device of claim 17, wherein the operating system enforces a requirement that communication between processes running in the desktop namespace and processes running in the service namespace must be implemented via interprocess communications.

24. The computer device of claim 23, wherein the plurality of desktop applications are assigned a set of operating system privileges that is set separately from a set of operating system privileges associated with a user account that starts the desktop application, and wherein the set of operating system privileges to which the one or more desktop applications are assigned do not include administrator operating system privileges.

25. The computer device of claim 23, wherein the operating system enforces a rule that the plurality of desktop applications cannot be elevated in operating system privileges.

26. The computer device of claim 23, wherein the operating system enforces a rule that prevents the plurality of desktop applications from writing to service files or service folders stored in a local memory storage unit.

27. The computer device of claim 17, wherein a message originating at a desktop application includes user identity information that identifies a user of the desktop application, and wherein the user identity information follows the message through the first service process that accesses the communications port to send the message via a communications network.

28. The computer device of claim 17, further including a desktop including a user interface, and wherein the operating system enforces a rule that prevents any of the service processes from directly accessing the desktop.

29. A computer device including: a processor; a memory adapted to store non-transitory operating system configuration data and data for a plurality of custom service accounts; an external media port; a local memory storage unit; and an operating system that executes on the processor according to the configuration data to execute (i) a plurality of desktop applications having respective application privilege sets in a desktop namespace on the computer device, the desktop applications being operable on behalf of a plurality of user accounts having respective user privilege sets,
(ii) a plurality of services that each have a respective preset set of operating system privileges associated therewith, each of the plurality of services granting access to a respective limited subset of resources defined in a service namespace in which the plurality of service processes execute,
and (iii) to provide respective pluralities of services from the plurality of services to each of the plurality of desktop applications, the service namespace being partitioned from the desktop namespace on the computer device,
wherein during startup of the computer device the operating system:
reads the configuration data and the data for the plurality of custom service accounts,
creates each of the plurality of custom service accounts according to the data,
for each of the plurality of custom service accounts, creates, according to the operating system configuration data, a corresponding set of operating system privileges,
creates the plurality of services, and
prior to the execution of the plurality of services as a plurality of service processes by the operating system during runtime of the computer device:
assigns, according to the configuration data, each of the plurality of services to one of the plurality of custom service accounts and the corresponding set of operating system privileges, and
for each of the plurality of services, create a corresponding process and assign the each of the plurality of services and the corresponding custom service account of the each of the plurality of services to the corresponding process to yield a corresponding service process to yield a plurality of service processes running during runtime;
wherein for each of the plurality of running service processes, the operating system enforces the corresponding respective operating system privileges of the correspondingly assigned custom service account to prevent the each running service process from obtaining any of the respective application privilege sets or any of the respective user privilege sets, such that
(1) upon a first one of the plurality of desktop applications requesting execution of a first service process from among the plurality of service processes while operating on behalf of a first one of the plurality of user accounts, the operating system requires that the first service process be executed under the operating system privileges of the correspondingly assigned first one of the plurality of custom service accounts to which the first service process was assigned, rather than under the privilege set of the first desktop application or the privilege set of the first user account so that the first service process is limited to access only the corresponding granted respective limited subset of resources,
wherein the corresponding set of operating privileges of a second one of the plurality of custom service accounts assigned to a second service process from among the plurality of service processes includes permission for writing to the local memory storage unit,
and wherein the corresponding set of operating privileges of the first one of the plurality of custom service accounts includes permission for communicating with a removable memory device via the external port and does not permit writing to the local memory storage unit such that the first service process executing under the first one of the plurality of custom service accounts is capable of communicating with the removable memory device via the external media port and cannot write to the local memory storage unit,
and (2) upon a second one of the plurality of desktop applications requesting execution of the first service process while operating on behalf of the second one of the plurality of user accounts, the operating system requires that the first service process be executed under the operating system privileges of the correspondingly assigned first one of the plurality of custom service accounts, rather than under the privilege set of the second desktop application or the privilege set of the second user account so that the first service process is limited to access only the corresponding granted respective limited subset of resources.

30. The computer device of claim 29, wherein the local memory storage unit stores service process files or service process folders.

31. The computer device of claim 30, wherein the local memory storage unit further stores desktop files.

32. The computer device of claim 29, wherein the computer device further includes a communications port, and wherein the first service process that is capable of communicating with a removable memory via the external media port does not have privileges to communicate directly with a further service process that has privileges to communicate via the communications port.

33. The computer device of claim 29, wherein the operating system enforces a requirement that communication between processes running in the desktop namespace and processes running in the service namespace must be implemented via interprocess communications.

34. The computer device of claim 33, wherein the plurality of desktop applications are assigned a set of operating system privileges that is set separately from a set of operating system privileges associated with a user account that starts the desktop application, and wherein the set of operating system privileges to which the plurality of desktop applications are assigned does not include administrator operating system privileges.

35. The computer device of claim 34, wherein the operating system enforces a rule that the plurality of desktop applications cannot be elevated in operating system privileges.

36. The computer device of claim 29, further including a desktop including a user interface, and wherein the operating system enforces a rule that prevents any of the service processes from directly accessing the desktop.

37. A computer device including: a processor; a memory adapted to store non-transitory operating system configuration data and data for a plurality of custom service accounts; an external media port; a communications port; and an operating system that executes on the processor according to the configuration data to execute (i) a plurality of desktop applications having respective application privilege sets in a desktop namespace on the computer device, the desktop applications being operable on behalf of a plurality of user accounts having respective user privilege sets, (ii) a plurality of services that each have a respective preset set of operating system privileges associated therewith, each of the plurality of services granting access to a respective limited subset of resources defined in a service namespace in which the plurality of service processes execute, and (iii) to provide respective pluralities of services from the plurality of services to each of the plurality of desktop applications, the service namespace being partitioned from the desktop namespace on the computer device, wherein during startup of the computer device the operating system reads the configuration data and the data for the plurality of custom service accounts, creates each of the plurality of custom service accounts according to the data, for each of the plurality of custom service accounts, creates, according to the operating system configuration data, a corresponding set of operating system privileges, creates the plurality of services, and prior to the execution of the plurality of services as a plurality of service processes by the operating system during runtime of the computer device:

assigns, according to the configuration data, each of the plurality of services to one of the plurality of custom service accounts and the corresponding set of operating system privileges, and for each of the plurality of services, create a corresponding process and assign the each of the plurality of services and the corresponding custom service account of the each of the plurality of services to the corresponding process to yield a corresponding service process to yield a plurality of service processes running during runtime;

wherein for each of the plurality of running service processes, the operating system enforces the corresponding respective operating system privileges of the correspondingly assigned custom service account to prevent the each running service process from obtaining any of the respective application privilege sets or any of the respective user privilege sets, such that (1) upon a first one of the plurality of desktop applications requesting execution of a first service process from among the plurality of service processes while operating on behalf of a first one of the plurality of user accounts, the operating system requires that the first service process be executed under the operating system privileges of the correspondingly assigned first one of the plurality of custom service accounts to which the first service process was assigned, rather than under the privilege set of the first desktop application or the privilege set of the first user account so that the first service process is limited to access only the corresponding granted respective limited subset of resources, wherein the corresponding set of operating privileges of a second one of the plurality of custom service accounts assigned to a second service process from among the plurality of service processes includes permission for accessing the communications port, and wherein the corresponding set of operating privileges of the first one of the plurality of custom service accounts includes permission for communicating with a removable memory device via the external media port and does not permit writing to the communications port such that the first service process executing under the first one of the plurality of custom service accounts is capable of communicating with the removable memory device via the external media port and cannot write to the communications port, and (2) upon a second one of the plurality of desktop applications requesting execution of the first service process while operating on behalf of the second one of the plurality of user accounts, the operating system requires that the first service process be executed under the operating system privileges of the correspondingly assigned first one of the plurality of custom service accounts, rather than under the privilege set of the second desktop application or the privilege set of the second user account so that the first service process is limited to access only the corresponding granted respective limited subset of resources.

38. The computer device of claim 37, wherein the first service process that is capable of communicating with a removable memory device via the external media port does not have the privilege to directly access the second service process that is capable of accessing the communications port.

39. The computer device of claim 37, wherein the operating system enforces a requirement that communication between processes running in the desktop namespace and processes running in the service namespace must be implemented via interprocess communications.

40. The computer device of claim 37, wherein the operating system enforces a requirement that communication between service processes and other service processes must be implemented via interprocess communications.

41. A computer device including: a processor; and a memory adapted to store non-transitory operating system configuration data and data for a plurality of custom service accounts; an operating system that executes on the processor according to the configuration data to execute (i) a plurality of desktop applications having respective application privilege sets in a desktop namespace on the computer device, the desktop applications being operable on behalf of a plurality of user accounts having respective user privilege sets, (ii) a plurality of services that each have a respective preset set of operating system privileges associated therewith, each of the plurality of services granting access to a respective limited subset of resources defined in a service namespace in which the plurality of service processes execute, and (iii) to provide respective pluralities of services from the plurality of services to each of the plurality of desktop applications, the service namespace being partitioned from the desktop wherein during startup of the computer device the operating system;

reads the configuration data and the data for the plurality of custom service accounts, creates each of the plurality of custom service accounts according to the data, for each of the plurality of custom service accounts, creates, according to the operating system configuration data, a corresponding set of operating system privileges, creates the plurality of services, and prior to the execution of the plurality of services as a plurality of service processes by the operating system during runtime of the computer device:

assigns, according to the configuration data, each of the plurality of services to one of the plurality of custom service accounts and the corresponding a set of operating system privileges, and for each of the plurality of services, create a corresponding process and assign the each of the plurality of services and the corresponding custom service account of the each of the plurality of services to the corresponding process to yield a corresponding a service process to yield a plurality of service processes running dining runtime;

wherein for each of the plurality of running service processes, the operating system enforces the corresponding respective operating system privileges of the correspondingly assigned custom service account to prevent the each running service process from obtaining any of the respective application privilege sets or any of the respective user privilege sets, such that (1) upon a first one of the plurality of desktop applications requesting execution of a first service process from among the plurality of service processes while operating on behalf of a first one of the plurality of user accounts, the operating system requires that the first service process be executed under the operating system privileges of the correspondingly assigned first one of the plurality of custom service accounts to which the first service process was as signal, rather than under the privilege set of the first desktop application or the privilege set of the first user account so that the first service process is limited to access only the corresponding granted respective limited subset of resources, and (2) upon a second one of the plurality of desktop applications requesting execution of the first service process while operating on behalf of the second one of the plurality of user accounts, the operating system requires that the first service process be executed under the operating system privileges of the correspondingly assigned first one of the plurality of custom service accounts, rather than under the privilege set of the second desktop application or the privilege set of the second user account so that the first service process is limited to access only the corresponding granted respective limited subset of resources.

42. The computer device of claim 41, wherein the operating system privileges of the plurality of desktop applications are a set of operating system privileges that is set separately from the operating system privileges of the plurality of user accounts on behalf of which the plurality of desktop applications run.

43. The computer device of claim 41, wherein the operating system privileges of the plurality of desktop applications are an identical set of operating system privileges which are not dependent on the operating system privileges associated with the plurality of user accounts on behalf of which the one or more desktop applications run.

44. The computer device of claim 43, wherein the identical set of operating system privileges to which the plurality of desktop applications are assigned do not include administrator operating system privileges.

45. The computer device of claim 44, wherein the identical set of operating system privileges to which the plurality of desktop applications are assigned are operating system privileges associated with a standard user account.

46. The computer device of claim 43, wherein the operating system enforces a rule that the plurality of desktop applications cannot be elevated in operating system privileges.

47. The computer device of claim 41, wherein the computer device includes a local memory storage unit, and wherein the operating system enforces a rule that prevents the plurality of desktop applications from writing to service files or service folders stored in the local memory storage unit.

48. The computer device of claim 41, further including a desktop including a user interface, and wherein the operating system enforces a rule that prevents any of the service processes from accessing the desktop.

49. The computer device of claim 41, wherein messages originating at the plurality of desktop applications include user identity information that identifies a user of a desktop application, and wherein the user identity information follows messages through multiple processes associated with sending the messages.

50. The computer device of claim 49, wherein the user identity information does not control the operating system privileges associated with one or more processes used to forward the message to a message recipient.

51. The computer device of claim 41, wherein the computer device further includes a communications port and a local memory storage unit, and wherein one of the service processes that is capable of communicating with the communication port does not have privilege to write to the local memory storage unit.

52. The computer device of claim 41, wherein the computer device further includes a communications port and an external media port, and wherein one of the service processes that is capable of communicating with the communications port does not have privilege to communicate with a removable storage unit via the external media port.

53. The computer device of claim 41, wherein the computer device further includes a communications port, a local memory storage unit, and an external media port, and wherein one of the service processes that is capable of communicating with the communication network port does not have privilege to write to the local memory storage unit or to communicate with a removable storage unit via the external media port, wherein one of the service processes that is capable of communicating with a removable storage unit via the external media port does not have privilege to write to the local memory storage unit and does not have privilege to communicate with the communications port, and wherein the one of the service processes that is capable of communicating with the communications port does not have privilege to directly communicate with the one of the service processes that is capable of communicating with a removable storage unit via the external media port.

54. A computer device including: a processor; and memory adapted to store non-transitory operating system configuration data and data for a plurality of custom service accounts; an operating system that executes on the processor according to the configuration data to execute
  (i) a plurality of desktop applications having respective application privilege sets in a desktop namespace on the computer device, the desktop applications being operable on behalf of a plurality of user accounts having respective user privilege sets,
  (ii) a plurality of services that each have a respective preset set of operating system privileges associated therewith, each of the plurality of services granting acres to a respective a limited subset of resources defined in a service namespace in which the plurality of service processes execute,
  and (iii) to provide respective pluralities of services from the plurality of services to each of the plurality of desktop applications, the service namespace being partitioned from the desktop
wherein during startup of the computer device the operating system;
  reads the configuration data and the data for the plurality of custom service accounts,
  creates each of the plurality of custom service accounts according to the data,
  for each of the plurality of custom service accounts, creates, according to the operating system configuration data, a corresponding set of operating system privileges,
  creates the plurality of services, and
  prior to the execution of the plurality of services as a plurality of service processes by the operating system during runtime of the computer device:
    assigns, according to the configuration data, each of the plurality of services to one of the plurality of custom service accounts and the corresponding e set of operating system privileges, and
  for each of the plurality of services, create a corresponding process and assign the each of the plurality of services and the corresponding custom service account of the each of the plurality of services to the corresponding process to yield a corresponding service process to yield a plurality of service processes running during runtime;
  wherein for each of the plurality of running service process, the operating system enforces the corresponding respective operating system privileges of the correspondingly assigned custom service account to prevent the each running service process from obtaining any of the respective application privilege sets or any of the respective user privilege sets, such that
    (1) upon a first one of the plurality of desktop applications requesting execution pf a first service process from among the plurality of service processes while operating on behalf of a first one of the plurality of user accounts, the operating system requires that the first service process be executed under the operating system privileges of the correspondingly assigned first one of the plurality of custom service accounts to which the first service process was assigned, rather than under the privilege set of the first desktop application or the privilege set of the first user account so that the first service process is limited to access only the corresponding granted respective limited subset of resources, and
    (2) upon a second one of the plurality of desktop applications requesting execution of the first service process while operating on behalf of the second one of the plurality of user accounts, the operating system requires that the first service process be executed under the operating system privileges of the correspondingly assigned first one of the plurality of custom service accounts, rather than under the privilege set of the second desktop application of the privilege set of the second user account so that the first service process is bated to access only the correspond lag granted respective limited subset of resources,
wherein the operating system enforces operating system privileges for each of the plurality of desktop applications using a standard set of operating system privileges defined for the desktop applications to be used for the desktop applications regardless of which of the plurality of user accounts calls the desktop application, and wherein a sending desktop application sends a message to a recipient process such that the message includes a user identity that identifies the logged-on user of the desktop application, wherein the user identity flows with the message as the message is processed by each of a number of different service processes as the message is relayed from the sending desktop application to the receiving process.

55. The computer device of claim 54, wherein the user identity information follows messages through multiple processes to their final destination, including through a service process that accesses the communications port to send the message via a communications link.

56. The computer device of claim 55, wherein at least either of (i) operating system privileges or (ii) access permissions associated with one or more processes are used to forward the message to a message recipient are independent of the user identity information.

57. The computer device of claim 56, wherein the user identity information controls the access permissions to process control objects in a process control network.

58. The computer device of claim 54, wherein the standard set of operating system privileges defined for the plurality of desktop applications does not include administrator operating system privileges.

59. The computer device of claim 58, wherein the operating system enforces a rule that the plurality of desktop applications cannot be elevated in operating system privileges.

60. The computer device of claim 54, wherein the computer device includes a local memory storage unit and wherein the operating system enforces a rule that prevents the plurality of desktop applications from writing to service files or service folders stored in the local memory storage unit.

61. The computer device of claim 54, further including a desktop including a user interface, and wherein the operating system enforces a rule that prevents any of the service processes from accessing the desktop.

62. The computer device of claim 54, wherein the user identity information does not affect the operating system privileges associated with one or more processes used to forward the message to the receiving process.

63. The computer device of claim 54, wherein the computer device further includes a communications port and a local memory storage unit, and wherein one of the service processes that is capable of communicating with the communication port does not have privilege to write to the local memory storage unit.

64. The computer device of claim 54, wherein the computer device further includes an external media port, and wherein the one of the service processes that is capable of communicating with the communications port does not have privilege to communicate with a removable storage unit via the external media port.

65. The computer device of claim 54, wherein the computer device further includes a communications port, a local memory storage unit, and an external media port, and wherein one of the service processes that is capable of communicating with the communication port does not have privilege to write to the local memory storage unit, wherein one of the service processes that is capable of communicating with a removable storage unit via the external media port does not have privilege to write to the local memory storage unit, and wherein the one of the service processes that is capable of communicating with the communications port does not have privilege to directly communicate with the one of the service processes that is capable of communicating with a removable storage unit via the external media port.

66. The computer device of claim 54, wherein communication between processes executed in the service namespace and processes executed in the desktop namespace must be implemented via interprocess communications.

67. The computer device of claim 1, wherein the preset set of operating system privileges for each of the plurality of custom service accounts is defined based on the privileges needed by the service processes that are assigned to the custom service account.

* * * * *